2,807,629

CATALYTIC DEHYDROGENATION OF DIALKYLENE GLYCOLS

John Barr Bell, Jr., Locust, N. J., assignor to Jefferson Chemical Company, Inc., New York, N. Y., a corporation of Delaware No Drawing. Application October 23, 1953,
Serial No. 388,042

8 Claims. (Cl. 260—340.2)

This invention relates to the catalytic dehydrogenation of dialkylene glycols to produce 2-p-dioxanones (2-p-dioxanone and alkyl-substituted 2-p-dioxanone). All percentages herein are on a weight basis.

It has been proposed to dehydrogenate dialkylene glycols in the vapor phase employing metal catalysts, such as copper, cobalt, iron, platinum, nickel, palladium, or a supported copper and chromium catalyst, the chromium content of which does not exceed about 5%. The use of a copper chromium catalyst containing 96.5% copper and 3.5% chromium for the dehydrogenation of diethylene glycol, according to the example of United States Patent 2,142,033, granted December 27, 1938, results in an over-all yield of 25%.

It is among the objects of this invention to provide a liquid phase process for dehydrogenating dialkylene glycols to produce 2-p-dioxanones.

Other objects and advantages of this invention will be apparent from the following detailed description thereof.

In accordance with this invention a dialkylene glycol having the formula

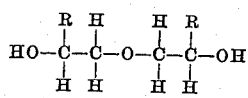

in which R is hydrogen, methyl or ethyl, is refluxed in the presence of a copper chromite catalyst containing from 10% to 50% chromium. The preferred catalyst is a copper (either cupric or cuprous) chromite substantially free of uncombined copper oxide and containing from 10% to 50% chromium. For the dehydrogenation of diethylene glycol, a copper chromite containing from 30% to 40% of chromium is the preferred catalyst. A cupric chromite having the formula $CuO.CuCr_2O_4$, a theoretical analysis of 51.1% CuO, 48.9% $Cr_2O_3$ and containing 33.4% chromium and the corresponding reduced copper compound, a cuprous chromite ($Cu_2Cr_2O_4$) containing about 35.3% chromium are particularly preferred for the dehydrogenation of diethylene glycol to produce 2-p-dioxanone. In the dehydrogenation of dipropylene glycol ($H_3CCHOHCH_2OCH_2CHOHCH_3$) a copper chromite catalyst containing chromium in amount near the lower portion of the 10% to 50% range tends to favor the production of dimethyl dioxanone, whereas a copper chromite catalyst containing chromium in amount near the upper portion of this range tends to favor the production of dimethyl dioxene. In the dehydrogenation of 3-oxahexanediol-1,5

($HOCH_2CH_2OCH_2CHOHCH_3$)

it appears to make little difference whether a high or low chromium containing catalyst within the aforesaid range is used; all catalysts tested result in yields of over 50% methyl dioxanone with minor amounts of methyl dioxene.

The cupric chromite desirably is added to the reaction vessel in the form of a black powder in amount of from ½% to 5%, preferably from 1 to 3%, based on the weight of the dialkylene glycol subjected to dehydrogenation. Upon mixing with the dialkylene glycol and heating to the point where hydrogen is initially evolved from the mixture, i. e., about 230° to about 240° C. at atmospheric pressure, the finely divided and suspended catalyst undergoes a color change from black to brick red. This is believed to be due to a reduction of the cupric chromite to a cuprous chromite corresponding to the formula $Cu_2Cr_2O_4$, or $Cu_2O.Cr_2O_3$. If desired, instead of adding cupric chromite, cuprous chromite in finely divided form may be employed as the catalyst. The amount of cuprous chromite thus employed may be from ½% to 5%, preferably from 1% to 3%, based on the weight of the dialkylene glycol.

The copper chromite catalyst may be prepared, for example, by dissolving ammonium dichromate in distilled water and adding aqueous ammonia to the resulting solution. This ammoniacal ammonium dichromate solution is then mixed with cupric nitrate in the proportion of 1 mol of the latter to 0.5 mol of ammonium dichromate. The precipitate of copper ammonium chromate thus produced is collected and dried at a temperature of about 110° C. This dry precipitate is then heated in a muffle furnace to about 350° to 450° C. to produce cupric chromite. The copper chromite thus formed is pulverized and extracted with dilute (10%) acetic acid to remove any uncombined copper oxide present as such. (This method of preparing the catalyst is more fully described in Organic Syntheses Col. vol. II, pages 142–145).

The resultant cupric chromite is ground to a fine black powder and suspended in the dialkylene glycol and the mixture boiled to effect the dehydrogenation. During the heating of the mixture to boiling, reduction of the black cupric chromite to a reddish cuprous chromite takes place.

The dehydrogenation is preferably carried out by mixing the catalyst with the dialkylene glycol in a distilling vessel and heating at temperatures of about 240° to 280° C. under atmospheric pressure while distilling off products having a boiling point lower than that of the dialkylene glycol until substantially all of the dialkylene glycol has reacted and the products therefrom distilled. In general, when operating under atmospheric pressure, the heating may be discontinued when the temperature in the still pot reaches about 275° to 280° C. In this way the amount of dioxenes and other by-products formed is minimized.

Heating of the suspension of catalyst and dialkylene glycol under atmospheric pressure is preferred because this permits carrying out the process in equipment which does not have to be designed to withstand high pressures. However, it will be understood that the heating may be carried out under superatmospheric pressure conditions, in which case the distillation temperatures will be higher than the temperatures above noted for operation at atmospheric pressure. In general, the increase in temperature will be proportional to the increase in pressure.

The following examples of the process are given for purposes of illustration only. It will be understood the invention is not limited to these examples.

*Example I.—Diethylene glycol*

1060 grams diethylene glycol and 15 grams of cupric chromite (containing 33.4% chromium) were placed in a still pot of two liters capacity communicating with a packed column which in turn communicated with a condenser. The mixture was heated to boiling during which heating the cupric chromite catalyst changed in color from black to brick red. At 230° to 240° C. still pot temperature, gas evolution began and continued at a rate of about 5 cubic feet per hour. 900 grams of overhead product were removed continuously under about a 5:1 reflux ratio at a column head temperature of 205° to 214° C. over a period of 3¾ hours during which the pot temperature rose to 273° C. The total gas evolution was 15.25 cubic feet measured at 24° C. The initial and final overhead fractions contained a small amount of light ends boiling below 200° C., the remainder (about 850 grams) was water-white 2-p-dioxanone.

A second and third dehydrogenation was carried out employing the residual catalyst slurry (containing cuprous chromite) which was still active, by adding 1060 grams of diethylene glycol to the still pot for each dehydrogenation. Heating was continued in each case until the temperature in the still pot rose to 275° C. at which point the heating was discontinued. In this way formation of dioxene and other by-products was minimized.

The total overhead obtained as condensate from the three runs was 2772 grams. This condensate was fractionated producing 2449 grams of 2-p-dioxanone. A yield of about 81% of theoretical was thus obtained.

Example II.—Dipropylene glycol

The equipment used in this example was similar to that of Example I, and a fresh portion of the same catalyst was used. 402 grams of dipropylene glycol was heated at 240° to 280° C. with 15 grams of the catalyst in general following the conditions of the initial dehydrogenation of Example I. There was thus obtained 194 grams of 2,6-dimethyl dioxene and 100 grams of 3,5-dimethyl-2-p-dioxanone corresponding to yields of 55% and 26%, respectively.

The 3,5-dimethyl-2-p-dioxanone is a slightly water-soluble, colorless, practically odorless liquid of boiling range 210.5°–211.0° C. at atmospheric pressure, a density at 24.5° C. of 1.08 and having a refractive index ($n_D^{20}$) of 1.4399. It has a structural formula as follows:

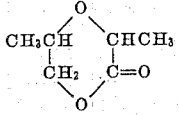

2,6-dimethyl dioxene is a colorless, water-insoluble liquid with a strong, sweet, ethereal odor, boiling at 125.5° C., having a density at 24.5° C. of 0.97, and a refractive index ($n_D^{20}$) of 1.4350.

Example III.—Dipropylene glycol

This example differed from Example II in that it involved the use of a copper chromite catalyst containing about 10% chromium. The use of this catalyst resulted in the production of 188 grams of 3,5-dimethyl-2-p-dioxanone and 77 grams of 2,6-dimethyl dioxene corresponding to yields of 50% and 23%, respectively.

Example IV.—3-oxahexanediol-1,5

This example, except for the substitution of 3-oxahexanediol-1,5 for the dipropylene glycol in the same relative amount was the same as Example II involving the use of a relatively high chromium catalyst. It resulted in a 52.3% yield of 6-methyl-2-p-dioxanone and 20.6% 5-methyl dioxene.

6-methyl-2-p-dioxanone is a colorless liquid completely miscible with water at room temperature, boiling between 209° and 213° C. at atmospheric pressure, and having a refractive index ($n_D^{20}$) of 1.4442. It has a structural formula as follows:

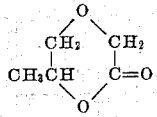

5-methyl dioxene is a colorless liquid, slightly soluble in water, having an ethereal odor, boiling between 114.7° and 116.3° C., and having a refractive index ($n_D^{20}$) of 1.4368.

Example V.—3-oxahexanediol-1,5

This example differs from Example IV in that it involved the use of a relatively low chromium catalyst, namely, about 10%. It resulted in a yield of 53.1% 6-methyl-2-p-dioxanone and 16% 5-methyl dioxene.

Surprisingly it has been found that 6-methyl-2-p-dioxanone and 3,5-dimethyl-2-p-dioxanone have little tendency to polymerize upon standing under atmospheric pressure and temperature conditions and in this respect differ materially from 2-p-dioxanone which on standing under atmospheric conditions polymerizes readily.

It will be noted this invention provides a liquid-phase process for dehydrogenating dialkylene glycols, particularly diethylene glycol to produce 2-p-dioxanone, which results in much higher yields of the desired product.

Since certain changes may be made in carrying out the above process without departing from the scope of the invention, it is intended that all matter contained in the above description shall be interpreted as illustrative and not in a limiting sense. Thus, instead of suspending the cupric chromite or cuprous chromite in the dialkylene glycol, the catalyst may be deposited on an inert carrier or support, such as silica, the resultant supported catalyst in finely divided form mixed with the dialkylene glycol and the mixture refluxed.

What is claimed is:

1. In the catalytic dehydrogenation of dialkylene glycols having the formula

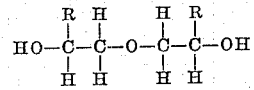

in which R is from the group consisting of hydrogen, methyl and ethyl, to produce 2-p-dioxanones, the improvement which comprises carrying out the reaction in the liquid phase at a temperature of 240° to 280° C. and in the presence of a copper chromite catalyst containing from 10% to 50% by weight of chromium.

2. The process of preparing 2-p-dioxanone which comprises catalytically dehydrogenating diethylene glycol in the liquid phase at a temperature of 240° to 280° C. and in the presence of a copper chromite catalyst containing from 10% to 50% by weight of chromium.

3. The process of preparing 2-p-dioxanone which comprises heating liquid diethylene glycol at a temperature of 240° to 280° C. and in the presence of a copper chromite catalyst substantially free of uncombined copper oxide and containing from 30% to 40% by weight of chromium.

4. The process of preparing 2-p-dioxanone which comprises mixing diethylene glycol with copper chromite substantially free of uncombined copper oxide and containing from 30% to 40% by weight of chromium, boiling the mixture at atmospheric pressure at a temperature of 240° to 280° C. and condensing the vapors of 2-p-dioxanone taken off overhead.

5. The process of preparing dimethyl dioxene and dimethyl dioxanone which comprises boiling dipropylene glycol in the presence of a copper chromite catalyst containing from 10% to 50% by weight of chromium at a temperature of 240° to 280° C. and taking off overhead dimethyl dioxanone and dimethyl dioxene.

6. The process defined in claim 5, in which the copper chromite catalyst contains about 10% chromium.

7. The process of producing methyl dioxanone which comprises boiling 3-oxahexanediol-1,5 in the presence of a copper chromite catalyst containing 10% to 50% by weight of chromium at a temperature of 240° to 280° C. and condensing the vapors of methyl dioxanone taken off overhead.

8. The process as defined in claim 7, in which the copper chromite catalyst contains from 30% to 40% by weight of chromium.

References Cited in the file of this patent

UNITED STATES PATENTS 2,142,033   McNamee et al. _____ Dec. 27, 1938

OTHER REFERENCES

Bischoff: Berichte 40, 2807 (1907).
Hollo: Berichte 61, 896 (1928).